United States Patent
Li et al.

(10) Patent No.: US 10,193,488 B2
(45) Date of Patent: Jan. 29, 2019

(54) METHODS AND SYSTEMS FOR REDUCING CONDUCTED ELECTROMAGNETIC INTERFERENCE

(71) Applicant: Regal Beloit America, Inc., Beloit, WI (US)

(72) Inventors: Ming Li, Fort Wayne, IN (US); Joseph Carnes, Columbia City, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 206 days.

(21) Appl. No.: 14/995,418

(22) Filed: Jan. 14, 2016

(65) Prior Publication Data

US 2017/0207763 A1    Jul. 20, 2017

(51) Int. Cl.
*H02P 27/04* (2016.01)
*H02P 27/06* (2006.01)
*H02M 1/44* (2007.01)
*H02P 29/50* (2016.01)

(52) U.S. Cl.
CPC .............. *H02P 27/06* (2013.01); *H02M 1/44* (2013.01); *H02P 29/50* (2016.02)

(58) Field of Classification Search
CPC ...... H03H 1/0007; H03H 7/0115; H02P 27/04
USPC ......................................................... 318/53
See application file for complete search history.

(56) References Cited

U.S. PATENT DOCUMENTS

| | | | |
|---|---|---|---|
| 6,008,560 A | 12/1999 | Becerra | |
| 6,909,607 B2 | 6/2005 | Radosevich et al. | |
| 6,982,873 B2 | 1/2006 | Meyer et al. | |
| 7,112,944 B1* | 9/2006 | Kojori | H02M 5/4505 290/31 |
| 7,142,434 B2 | 11/2006 | Beihoff et al. | |
| 7,276,859 B1 | 10/2007 | Trestman | |
| 8,981,686 B2* | 3/2015 | Becerra | H02P 21/24 318/400.02 |
| 9,178,485 B2* | 11/2015 | Nardin | H03H 7/0138 |
| 2005/0225270 A1* | 10/2005 | Schnetzka | H02M 5/4585 318/66 |
| 2006/0227483 A1* | 10/2006 | Akagi | H02M 1/12 361/118 |
| 2012/0161525 A1* | 6/2012 | Hong | H02P 27/08 307/73 |
| 2012/0177133 A1* | 7/2012 | Oldenkamp | H04B 3/54 375/257 |

(Continued)

*Primary Examiner* — Kawing Chan
(74) *Attorney, Agent, or Firm* — Armstrong Teasdale LLP

(57) ABSTRACT

An EMI filter is described that includes an input having first and second input terminals, and an output having first and second output terminals. A first conductive path is defined between the first input and output terminals, and a second conductive path is defined between the second input and output terminals. The EMI filter also includes a first choke device coupled across the first and second conductive paths, and a first Y capacitor including a first end and a second end opposite the first end, the first end coupled to the first conductive path downstream from the first choke device. The EMI filter further includes a second Y capacitor including a first end and a second end opposite the first end, the first end coupled to the second conductive path downstream from the first choke device, and a second choke device coupled to an inverter output.

20 Claims, 2 Drawing Sheets

(56) References Cited

U.S. PATENT DOCUMENTS

| | | | | |
|---|---|---|---|---|
| 2014/0071564 A1* | 3/2014 | Kim | ............... | H02H 1/0015 361/42 |
| 2014/0203755 A1* | 7/2014 | Becerra | ............... | H02P 6/10 318/812 |
| 2014/0252896 A1* | 9/2014 | Nardin | ............... | H03H 7/0138 310/71 |
| 2014/0260410 A1* | 9/2014 | Chretien | ............... | H02P 27/08 62/426 |
| 2015/0207449 A1* | 7/2015 | Clendenen | ............... | H02P 29/0241 318/400.22 |
| 2015/0318103 A1* | 11/2015 | Rozman | ............... | H01F 27/24 363/44 |
| 2016/0079888 A1* | 3/2016 | Li | ............... | H02P 6/002 318/400.3 |
| 2016/0329841 A1* | 11/2016 | Tagashira | ............... | B25J 9/161 |

* cited by examiner

METHODS AND SYSTEMS FOR REDUCING CONDUCTED ELECTROMAGNETIC INTERFERENCE

BACKGROUND OF THE DISCLOSURE

The embodiments described herein relate generally to reduction of electromagnetic interference (EMI), and more specifically, to reducing conducted EMI in electronically commutated motors and switching power supplies.

At least some known electronic devices produce unwanted electrical noise. Such electrical noise can adversely affect other electronic circuit components either within the electronic device itself or in nearby external electronic devices. Conducted EMI is an electrical noise current which is typically present in the radio-wave frequency range and sometimes referred to as radio frequency interference (RFI). This current originates from within a system of electrical devices rather than from an outside source such as a radio signal transmitter. Electric power supplies of electric motors are sometimes significant generators of EMI. In connection with electric power supplies, EMI is undesirable because, for example, it can disturb the operation or degrade the performance of other equipment connected to the same source of power.

In residential and industrial applications, federal regulations have required manufacturers to control conducted EMI generated by power electronic devices. More specifically, all motor drive products in residential and commercial applications must meet a corresponding EMI standard, such as FCC Class A (commercial) and Class B (residential). Class A has a limit that is 10 dBuV higher than Class B. To reduce EMI in electric motors, at least some manufacturers connect large, bulky EMI filters to the motor controller of an electric motor, which typically require manual installation and take up significant space. However, as demand for smaller, more compact electric motors increases, manufacturers are limited in EMI filter design, size, and cost.

BRIEF DESCRIPTION

In one aspect, an electromagnetic interference (EMI) filter is provided that includes an input having a first input terminal and a second input terminal, and an output having a first output terminal and a second output terminal. A first conductive path is defined between the first input terminal and the first output terminal, and a second conductive path is defined between the second input terminal and the second output terminal. The EMI filter also includes a first choke device coupled across the first and second conductive paths, and a first Y capacitor including a first end and a second end opposite the first end, the first end coupled to the first conductive path downstream from the first choke device. The EMI filter further includes a second Y capacitor including a first end and a second end opposite the first end, the first end coupled to the second conductive path downstream from the first choke device, and a second choke device coupled to an inverter output.

In another aspect, an electric motor drive circuit configured to drive a first electric motor and a second electric motor is provided. The electric motor drive circuit includes a rectifier configured to convert an AC input voltage to a pulsed DC voltage, a first DC link electrically coupled to said rectifier, the first DC-link comprising a low-capacitance capacitor having a capacitance less than 10 µF, and a first inverter coupled to the first DC-link, the first inverter configured to generate a conditioned output voltage to drive the first electric motor. The electric motor drive circuit also includes a second DC-link electrically coupled to the first DC-link, a second inverter coupled to the second DC-link, the second inverter configured to generate a conditioned output voltage to drive the second electric motor, and an EMI filter. The EMI filter includes an input having a first input terminal and a second input terminal, and an output having a first output terminal and a second output terminal. A first conductive path is defined between the first input terminal and the first output terminal, and a second conductive path is defined between the second input terminal and the second output terminal. The EMI filter also includes a first choke device coupled across the first and second conductive paths, and a first Y capacitor including a first end and a second end opposite the first end, the first end coupled to the first conductive path downstream from the first choke device. The EMI filter further includes a second Y capacitor including a first end and a second end opposite the first end, the first end coupled to the second conductive path downstream from the first choke device, and a second choke device coupled between said second inverter and the second electric motor.

In yet another aspect, an electric motor system is provided that includes a first electric motor including a first electric motor drive circuit configured to drive the first electric motor, a second electric motor including a second electric motor drive circuit configured to drive the second electric motor, and a common electric motor drive circuit configured to condition power provided to the first and second electric motor drive circuits, the common electric motor drive circuit including an electromagnetic interference (EMI) filter comprising an input having a first input terminal and a second input terminal, and an output having a first output terminal and a second output terminal. A first conductive path is defined between the first input terminal and the first output terminal, and a second conductive path is defined between the second input terminal and the second output terminal. The EMI filter also includes a first choke device coupled across the first and second conductive paths, and a first Y capacitor including a first end and a second end opposite the first end, the first end coupled to the first conductive path downstream from the first choke device. The EMI filter further includes a second Y capacitor including a first end and a second end opposite the first end, the first end coupled to the second conductive path downstream from the first choke device, and a second choke device coupled to an inverter output.

DETAILED DESCRIPTION

The embodiments described herein relate generally to reduction of electromagnetic interference (EMI), and more specifically, to reducing conducted EMI in electronically commutated motors and switching power supplies. Although generally described herein with reference to a motor, the methods and systems for reducing EMI described herein may be used to reduce EMI in a variety of electrical apparatus, including for example, switching power supplies.

Figure 1:
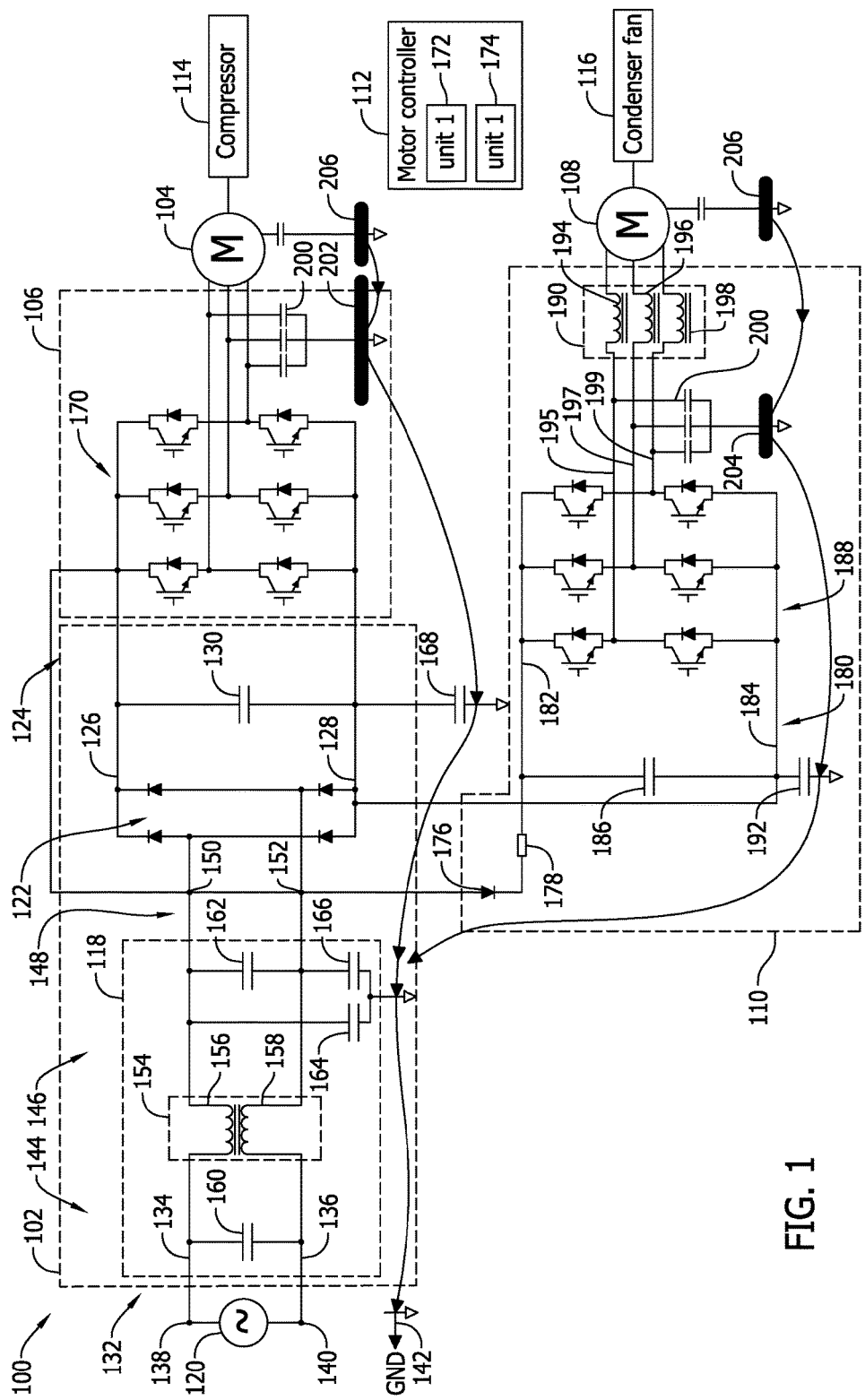
FIG. 1 is a circuit diagram of an exemplary hybrid twin motor system.

FIG. 1 is a circuit diagram of an exemplary hybrid twin motor system 100. In the exemplary embodiment, hybrid twin motor system 100 includes a common motor drive circuit 102 that combines common components of a compressor motor drive circuit and a condenser motor drive circuit. More specifically, in the exemplary embodiment, hybrid twin motor system 100 includes common motor drive circuit 102, a first electric motor 104 having a first motor drive circuit 106, a second electric motor 108 having a second motor drive circuit 110, and a motor controller 112. System 100 is referred to as a hybrid system because it may use either a low-capacitance capacitor (between about 0.1 µF and about 10 µF) in first motor drive circuit 106 and a high-capacitance capacitor (between about 200 µF and 1000 µF) in second motor drive circuit 110.

In the exemplary embodiment, and as described herein, first electric motor 104 is a compressor motor 104 for a compressor 114, first motor drive circuit 106 is a compressor motor drive circuit 106, second electric motor 108 is a condenser fan motor 108 for a condenser fan 116, and second motor drive circuit 110 is a condenser fan motor drive circuit 110. In the exemplary embodiment, compressor motor drive circuit 106 is loaded by compressor motor 104, which has a power capability between about 1.1 HP~7.1 HP, and condenser fan motor drive circuit 110 is loaded by a condenser fan motor 108, which has a power capability of about ⅓ HP. Motors 104 and 108 are electronically commutated motors. In other embodiments, motors 104 and 108 may be any type of motor that may benefit from EMI reduction, including for example, a permanent magnet synchronous motor (PMSM), a stepper motor, a variable frequency driven induction motor, etc. In some embodiments motors 104 and 108 may be used in air moving applications used in the heating, ventilation, and air conditioning (HVAC) industry, may be used in fluid pumping applications, and/or may be used in commercial and industrial applications. In other embodiments, motors 104 and 108 may engage any suitable work component and be configured to drive such a work component.

In the exemplary embodiment, common motor drive circuit 102 includes an electromagnetic interference (EMI) filter 118 configured to be coupled to a power supply 120, a rectifier 122, a first DC-link 124 defined by a positive DC-link rail 126 and a negative DC-link rail 128, and a low-capacitance capacitor 130 coupled across first DC-link 124.

EMI filter 118 is coupled at an input 132 to power supply 120, which is a single phase alternating current (AC) power supply that inputs AC power to a first conductive path 134 and a second conductive path 136. Input 132 includes a first input terminal 138 and a second input terminal 140. Power supply 120 is also coupled to earth ground 142. Power supply 120 may produce 187~264 volts root mean square (VRMS) depending on the applications of electric motors 104 and 108.

EMI filter 118 is coupled between power supply 120 and rectifier 122. EMI filter 118 includes a line side 144 coupled to power supply 120 via first and second input terminals 138 and 140, and a load side 146 coupled to rectifier 122 via an output 148. Output 148 includes a first output terminal 150 and a second output terminal 152. A first choke device 154 is coupled across first and second conductive paths 134 and 136 between line side 144 and load side 146. First choke device 154 is a common mode choke that includes a first choke inductor 156 and a second choke inductor 158 electromagnetically coupled to first choke inductor 156. A first, line-side X capacitor 160 is coupled to first conductive path 134 and second conductive path 136 between input 132 and first choke device 154. Load side 146 includes a second, load-side X capacitor 162 coupled across first and second conductive paths 134 and 136, a first Y capacitor 164 coupled to first conductive path 134 and ground 142, and a second Y capacitor 166 coupled to second conductive path 136 and ground 142. Line-side X capacitor 160, load-side X capacitor 162, and leakage inductance of first choke device 154 form a differential mode EMI filter.

In the exemplary embodiment, power supply 120 is a single phase alternating current power source, such as an electrical grid or utility, and supplies a sine wave input voltage. EMI filter 118 is configured to prevent EMI noise from coupling back to power supply 120 and also to reduce the EMI current through the bearing system of electric motors 104 and 108. The signals output from EMI filter 118 are applied to rectifier 122, which transforms the sine wave input voltage to a rectified AC voltage. The rectified AC voltage is provided across first DC-link 124.

First DC-link 124 includes low-capacitance capacitor 130 and a first bypass Y capacitor 168. Low-capacitance capacitor 130 is configured to store small amounts of energy when input voltage is available. In the exemplary embodiment, low-capacitance capacitor 130 is a film capacitor and has a capacitance between about 0.1 µF and about 10 µF. The use of bulky, unreliable electrolytic filter capacitors in common motor drive circuit 102 is avoided. Low-capacitance capacitor 130 is used as the energy storage component for compressor motor 104. Further, low-capacitance capacitor 130 facilitates increasing a power factor of hybrid twin motor system 100 to at least about 0.9. First bypass Y capacitor 168 provides a bypass path for common mode current flowing from inverter 170 to earth ground 142.

In the exemplary embodiment, compressor motor drive circuit 106 is coupled to an output of first DC-link 126. Compressor motor drive circuit 106 includes an inverter 170 configured to be coupled to compressor motor 104. In the exemplary embodiment, inverter 170 is a three-phase DC-AC voltage source inverter and includes a set of inverter switches for each of the three phases. Inverter 170 is configured to receive control signals from motor controller 112 and supply compressor motor 104 with conditioned AC voltage accordingly.

In the exemplary embodiment, motor controller 112 is programmed to control operation of both compressor motor 104 and condenser fan motor 108 of hybrid twin motor system 100. More specifically, motor controller 112 includes a first control unit 172 operable to perform current control and pulse-width modulated (PWM) signal generation for compressor motor 104 and a second control unit 174 operable to perform current control and PWM signal generation for condenser fan motor 108.

First control unit 172 is configured to implement direct power transfer (DPT) control of power supplied to drive compressor 114. More specifically, first control unit 172 is configured to increase energy transfer from compressor motor 104 to compressor 114 when input voltage is available and to mitigate a reduction in energy transfer from compressor 114 to compressor motor 104 to produce positive torque when DC-link voltage has approximately 100% voltage ripple. To control compressor 114, first control unit 172 is configured to generate PWM signals that are applied to inverter 170 to control rotation of compressor motor 104.

Due to the nature of DPT control, the DC-link voltage of the compressor inverter is that of the full wave rectified AC input voltage, which makes the equivalent common mode EMI noise source become smaller as compared to traditional technologies that have a constantly high DC-link voltage. Because of DPT control, it is not necessary to use a three-phase common mode choke between the compressor inverter and the compressor motor.

In the exemplary embodiment, second or condenser fan motor drive circuit 110 includes a diode 176, a negative temperature coefficient (NTC) resistor 178, a second DC-link 180 defined by a second positive DC-link rail 182 and a second negative DC-link rail 184, a high-capacitance capacitor 186 coupled across second DC-link 180, an inverter 188, and a second choke device 190.

Diode 176 and NTC resistor 178 are coupled between low-capacitance capacitor 130 and high-capacitance capacitor 186. In the exemplary embodiment, diode 176 and NTC resistor 178 are configured to provide inrush current protection for condenser fan motor drive circuit 110 that may be caused by the presence of high-capacitance capacitor 186.

Second DC-link 180 includes high-capacitance capacitor 186 and a second bypass Y capacitor 192. In the exemplary embodiment, high-capacitance capacitor 186 has a capacitance between about 200 µF and 1000 µF. High-capacitance capacitor 186 receives the rectified AC voltage generated by rectifier 122 and generates a smoothed DC voltage that is applied to inverter 188. Second bypass Y capacitor 192 provides a bypass path for common mode current flowing from inverter 188 to earth ground 142.

Inverter 188 is configured to be coupled to condenser fan motor 108. In the exemplary embodiment, inverter 188 is a three-phase DC-AC voltage source inverter and includes a set of inverter switches for each of the three phases. Inverter 188 is configured to receive control signals from motor controller 112 and supply condenser fan motor 108 with conditioned AC voltage accordingly.

In the exemplary embodiment, second choke device 190 is coupled between inverter 188 and condenser fan motor 108. Second choke device 190 is a three-phase common mode choke and includes a first choke inductor 194 coupled to a first phase output 195 of inverter 188, a second choke inductor 196 coupled to a second phase output 197 of inverter 188, and a third choke inductor 198 coupled to a third phase output 199 of inverter 188.

In the exemplary embodiment, second control unit 174 is configured to generate PWM signals that are applied to inverter 188 to control rotation of condenser fan motor 108 using energy stored on high-capacitance capacitor 186.

In some embodiments, hybrid motor system 100 additionally includes one or more blower motors and one or more associated blower motor drive circuits. In such implementations, system 100 is a hybrid triple or "trio" motor system. Each of the one or more blower motor drive circuits include similar components and operate similarly to condenser fan motor drive circuit 110. In such embodiments, a single drive circuit would control operation of compressor 114, condenser fan 116, and the one or more blowers.

During operation, inverters 170 and 188 are the sources of common mode EMI and conduct common mode noise current to parasitic paths 200 between inverter output terminals and respective heatsinks 202 and 204. At the same time, the common mode voltage noise source produces common mode noise current between inverter output lines and ground terminal 142. An equivalent capacitance is formed by bearing systems 206 of motors 104 and 108. The total common mode current flows back to EMI filter 102. At least a portion of the total common mode current is absorbed by Y-capacitors 164, 166, 168, 192 while the other portion of common mode current (which is the load CM noise current) flows back to the utility.

The EMI filter 118 shown in FIG. 1 suppresses a sufficient amount of EMI during operation of electric motors 104 and 108 to meet FCC Class A standards for commercial use. More specifically, EMI filter 118 (together with common-mode choke 190, Y-capacitors 168, 192) suppresses EMI at the noise source, at the noise load, and within the noise conduction path to meet EMI standards. EMI filter 118 provides sufficient EMI suppression while achieving a reduced size, higher power density, and lower system cost.

Figure 2:
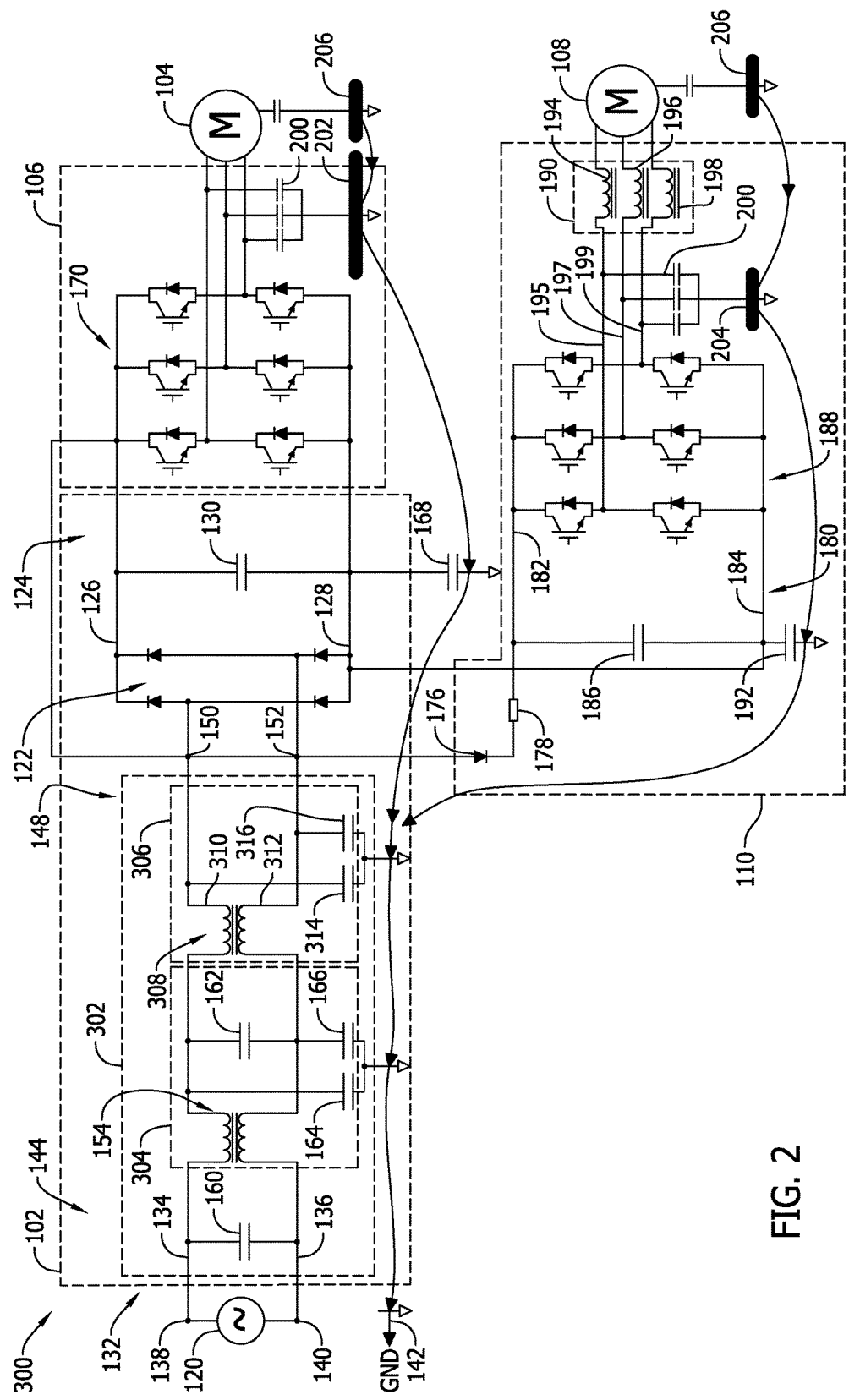
FIG. 2 is a circuit diagram of an exemplary hybrid twin motor system.

FIG. 2 is a circuit diagram of a hybrid twin motor system 300. System 300 is substantially similar to system 100 (shown in FIG. 1), except system 300 includes an alternative EMI filter 302. As such, components common to both FIGS. 1 and 2 are labeled in FIG. 2 with the same reference numbers used in FIG. 1, and their descriptions will not be repeated herein.

EMI filter 302 is coupled at an input 132 to a power supply 120, which is a single phase alternating current (AC) power supply that inputs AC power to first conductive path 134 and second conductive path 136. Input 132 includes first input terminal 138 and second input terminal 140. Power supply 120 is also coupled to earth ground 142. Power supply 120 may produce 187~264 VRMS depending on the applications of electric motors 104 and 108.

EMI filter 302 is coupled between power supply 120 and rectifier 122. EMI filter 302 includes a line side 144 coupled to power supply 120 via first and second input terminals 138 and 140, and a load side 146 coupled to rectifier 122 via an output 148. Output 148 includes a first output terminal 150 and a second output terminal 152. EMI filter 302 includes a first stage 304 coupled to first and second input terminals 138 and 140, and a second stage 306 coupled between an output of first stage 304 and first and second output terminals 150 and 152.

First stage 304 includes first choke device 154 coupled across first and second conductive paths 134 and 136 between line side 144 and second stage 306. First choke device 154 is a common mode choke that includes first choke inductor 156 and second choke inductor 158 electromagnetically coupled to first choke inductor 156. First common mode choke 154 is a ferrite choke. First stage 304 also includes first Y capacitor 164 coupled to first conductive path 134 and ground 142, and second Y capacitor 166 coupled to second conductive path 136 and ground 142.

Second stage 306 includes a third choke device 308 coupled across first and second conductive paths 134 and 136 between first stage 304 and load side 146. Third choke device 308 is a common mode choke that includes a first choke inductor 310 and a second choke inductor 312 electromagnetically coupled to first choke inductor 310. Third choke device 308 has a regular ferrite core or a radio frequency (RF) core that has lower common mode inductance relative to first common mode choke 154. Second stage 306 also includes a first Y capacitor 314 coupled to first conductive path 134 and ground 142, and a second Y capacitor 316 coupled to second conductive path 136 and ground 142.

EMI filter 302 further includes first X capacitor 160 coupled to first conductive path 134 and second conductive path 136 upstream from first stage 304, and second X capacitor 162 coupled across first and second conductive paths 134 and 136 between first stage 304 and second stage 306. First X capacitor 160, second X capacitor 162, and leakage inductance of first choke device 154 form a differential mode EMI filter.

During operation, inverters 170 and 188 are the sources of common mode EMI and conduct common mode noise current to parasitic paths 200 between inverter output terminals and respective heatsinks 202 and 204. At the same time, the common mode voltage noise source produces common mode noise current between inverter output lines and ground terminal 142. An equivalent capacitance is formed by bearing systems 208 of motors 104 and 108. The total common mode current flows back to EMI filter 102. At least a portion of the total common mode current is absorbed by Y-capacitors 164, 166, 168, 192, 314, and 316 while the other portion of common mode current (which is the load CM noise current) flows back to the utility.

The two-stage EMI filter 302 shown in FIG. 2 suppresses a sufficient amount of EMI during operation of electric motors 104 and 108 to meet FCC Class B standards for residential use. More specifically, EMI filter 302 suppresses EMI at the noise source, at the noise load, and within the noise conduction path to meet EMI standards.

Described herein are exemplary EMI filters, motor drive circuits, and electric motor systems for reducing conducted EMI. The filters, circuits, and systems may be used with any electronic device that may benefit from the reduced EMI. The filters, circuits, and systems described herein facilitate efficient and economical EMI reduction in electric motors that meets EMI standards. The filters are integrated onboard with the electric motor drive circuit, which eliminates the costly and time-consuming necessity for manual installation of line chokes on the motor. Additionally, the filters, circuits, and systems described herein utilize fewer components, which results in reduced size and reduced cost of manufacturing the EMI filters. Exemplary embodiments of methods, systems, and apparatus are described and/or illustrated herein in detail. The methods, systems, and apparatus are not limited to the specific embodiments described herein, but rather, components of each system and/or apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electromagnetic interference (EMI) filter system for a twin motor system that includes a first drive circuit having a first direct current (DC) link with a capacitor having a capacitance less than 10 µF and a first inverter for driving a first motor, and a second drive circuit having a second DC link coupled to the first DC link and including a capacitor having a capacitance between about 200 µF and 1000 µF and a second inverter for driving a second motor; said EMI filter system comprising:
    a line-side filter configured to filter input power for transmission to the first DC link and the second DC link, said line-side filter comprising:
        an input comprising a first input terminal and a second input terminal;
        an output comprising a first output terminal and a second output terminal, wherein a first conductive path is defined between the first input terminal and the first output terminal, and a second conductive path is defined between the second input terminal and the second output terminal;
        a first choke device coupled across the first and second conductive paths;
        a first Y capacitor including a first end and a second end opposite the first end, the first end coupled to the first conductive path downstream from said first choke device; and
        a second Y capacitor including a first end and a second end opposite the first end, the first end coupled to the second conductive path downstream from said first choke device; and
    a load-side filter comprising a second choke device coupled between the second inverter and the second motor.

2. The EMI filter system according to claim 1, wherein said input further comprises a ground terminal, the second ends of said first and said second Y capacitors are operatively coupled to the ground terminal.

3. The EMI filter system according to claim 1, further comprising:
    a first X capacitor coupled from the first conductive path to the second conductive path between said input and said first choke device; and
    a second X capacitor coupled from the first conductive path to the second conductive path between said first choke device and said output.

4. The EMI filter system according to claim 3, wherein said first X capacitor, said second X capacitor, and said first choke device form a differential mode EMI filter.

5. The EMI filter system according to claim 1, wherein said second choke device comprises a three-phase common mode choke.

6. The EMI filter system according to claim 1, wherein said second choke device comprises:
    a first choke inductor coupled to a first phase inverter output;
    a second choke inductor coupled to a second phase inverter output; and
    a third choke inductor coupled to a third phase inverter output.

7. The EMI filter system according to claim 1, further comprising a third choke device coupled across the first and second conductive paths between said first choke device and said output.

8. The EMI filter system according to claim 7, further comprising:
    a third Y capacitor coupled to the first conductive path and a ground terminal between said third choke device and said output; and
    a fourth Y capacitor coupled to the second conductive path and the ground terminal between said third choke device and said output.

9. The EMI filter system according to claim 7, wherein said third choke device comprises one of a ferrite core or a radio frequency (RF) core having lower common mode inductance relative to said first choke device.

10. An electric motor drive circuit configured to drive a first electric motor and a second electric motor, said electric motor drive circuit comprising:
a rectifier configured to convert an AC input voltage to a pulsed DC voltage;
a first DC link electrically coupled to said rectifier, said first DC-link comprising a low-capacitance capacitor having a capacitance less than 10 µF;
a first inverter coupled to said first DC-link, said first inverter configured to generate a conditioned output voltage to drive the first electric motor;
a second DC-link electrically coupled to said first DC-link;
a second inverter coupled to said second DC-link, said second inverter configured to generate a conditioned output voltage to drive the second electric motor; and
an electromagnetic interference (EMI) filter system comprising:
a line-side filter configured to filter input power for transmission to said rectifier, said line-side filter comprising:
an input comprising a first input terminal and a second input terminal;
an output coupled to an input of said rectifier, said output comprising a first output terminal and a second output terminal, wherein a first conductive path is defined between the first input terminal and the first output terminal, and a second conductive path is defined between the second input terminal and the second output terminal;
a first choke device coupled across the first and second conductive paths;
a first Y capacitor including a first end and a second end opposite the first end, the first end coupled to the first conductive path downstream from said first choke device; and
a second Y capacitor including a first end and a second end opposite the first end, the first end coupled to the second conductive path downstream from said first choke device; and
a load-side filter comprising a second choke device coupled between said second inverter and the second electric motor.

11. The electric motor drive circuit according to claim 10, wherein said second DC-link comprises a high-capacitance capacitor having a capacitance between about 200 µF and 1000 µF.

12. The electric motor drive circuit according to claim 10, wherein said input further comprises a ground terminal, the second ends of said first and said second Y capacitors are operatively coupled to the ground terminal.

13. The electric motor drive circuit according to claim 10, further comprising:
a first X capacitor coupled from the first conductive path to the second conductive path between said input and said first choke device; and
a second X capacitor coupled from the first conductive path to the second conductive path between said first choke device and said output.

14. The electric motor drive circuit according to claim 13, wherein said first X capacitor, said second X capacitor, and said first choke device form a differential mode EMI filter.

15. The electric motor drive circuit according to claim 10, wherein said second choke device comprises a three-phase common mode choke.

16. The electric motor drive circuit according to claim 10, wherein said second choke device comprises:
a first choke inductor coupled to a first phase inverter output;
a second choke inductor coupled to a second phase inverter output; and
a third choke inductor coupled to a third phase inverter output.

17. The electric motor drive circuit according to claim 10, further comprising a third choke device coupled across the first and second conductive paths between said first choke device and said output.

18. The electric motor drive circuit according to claim 17, further comprising:
a third Y capacitor coupled to the first conductive path and a ground terminal between said third choke device and said output; and
a fourth Y capacitor coupled to the second conductive path and the ground terminal between said third choke device and said output.

19. An electric motor system comprising:
a first electric motor including a first electric motor drive circuit having a first direct current (DC) link with a capacitor having a capacitance less than 10 µF and a first inverter configured to drive said first electric motor;
a second electric motor including a second electric motor drive circuit having a second DC link coupled to the first DC link and including a capacitor having a capacitance between about 200 µF and 1000 µF and a second inverter configured to drive said second electric motor; and
a common electric motor drive circuit configured to condition power provided to the first and second electric motor drive circuits, said common electric motor drive circuit comprising:
an electromagnetic interference (EMI) filter system comprising:
a line-side filter configured to filter input power for transmission to said common electric motor drive circuit, said line-side filter comprising:
an input comprising a first input terminal and a second input terminal;
an output comprising a first output terminal and a second output terminal, wherein a first conductive path is defined between the first input terminal and the first output terminal, and a second conductive path is defined between the second input terminal and the second output terminal;
a first choke device coupled across the first and second conductive paths;
a first Y capacitor including a first end and a second end opposite the first end, the first end coupled to the first conductive path downstream from said first choke device; and
a second Y capacitor including a first end and a second end opposite the first end, the first end coupled to the second conductive path downstream from said first choke device; and
a load-side filter comprising a second choke device coupled between the second electric motor drive circuit and the second electric motor.

20. The electric motor system according to claim 19, wherein said electric motor system is configured for use in a heating, ventilation, and air conditioning (HVAC) system.

* * * * *